United States Patent [19]

Bruder

[11] Patent Number: 4,621,035
[45] Date of Patent: Nov. 4, 1986

[54] LITHIUM BATTERIES WITH LAMINAR ANODES

[75] Inventor: Alan H. Bruder, Burlington, Mass.

[73] Assignee: Polaroid Corporation, Cambridge, Mass.

[21] Appl. No.: 341,197

[22] Filed: Jan. 20, 1982

[51] Int. Cl.⁴ .............................................. H01M 6/46
[52] U.S. Cl. .................... 429/152; 429/162; 429/194
[58] Field of Search ............... 429/152, 162, 194, 197

[56] References Cited

U.S. PATENT DOCUMENTS

| | | | |
|---|---|---|---|
| 3,853,627 | 12/1974 | Lehmann et al. | 136/83 |
| 4,086,400 | 4/1978 | Hyland et al. | 429/122 |
| 4,119,770 | 10/1978 | Land | 429/152 |
| 4,278,741 | 7/1981 | Kalnoki-kis | 429/196 X |
| 4,287,276 | 9/1981 | Lundquist, Jr. et al. | 429/206 |
| 4,315,976 | 2/1982 | Conte | 429/194 |
| 4,333,994 | 6/1982 | Urry | 429/194 X |
| 4,361,633 | 11/1982 | Nel et al. | 429/152 X |
| 4,374,186 | 2/1983 | McCartney et al. | 429/194 X |
| 4,379,817 | 4/1983 | Kozawa | 429/194 X |
| 4,391,729 | 7/1983 | Liang et al. | 429/194 X |

Primary Examiner—Charles F. LeFevour
Attorney, Agent, or Firm—Gaetano D. Maccarone

[57] ABSTRACT

Laminar electrode subassemblies comprising a lithium layer having one surface consisting essentially of metallic lithium adhered to a conductive plastic substrate, and a method of making such subassemblies in which a web of lithium foil having at least one freshly exposed surface is laminated directly to a conductive plastic substrate without an intermediate layer of conductive plastic adhesive.

5 Claims, 9 Drawing Figures

LITHIUM BATTERIES WITH LAMINAR ANODES

This invention relates to electrical cells, and particularly to a novel anode construction for lithium batteries of one or more cells.

Extensive efforts have been devoted to the development of lithium batteries for applications in which the potentially high energy density available would make such batteries especially attractive; e.g., in hearing aids, watches, airborne devices, and the like. Perhaps because of the highly reactive nature, not only of metallic lithium, but of many of the cathode, electrolyte, and electrolyte solvent materials that have been considered in conjunction with the lithium anode, the constructions and methods of assembly of lithium cells heretofore proposed and adopted have involved relatively labor intensive procedures culminating with the intricate assembly of a number of discrete components for each cell. The object of this invention is to simplify the manufacture of lithium cells, and more particularly, to facilitate the manufacture of lithium anode assemblies.

Conventional practice in the manufacture of lithium anodes is exemplified by U.S. Pat. No. 3,853,627, which describes a button cell having a lithium anode formed as a disc of lithium in which a grid of nickel plated steel, or stainless steel, is embedded. The grid is welded to a nickel plated steel cover for the cell, and serves as an anode current collector. The welding and embedding operations are inherently rather demanding ones that must be carefully and correctly performed during the manufacture of each cell. The metal grids are inherently expensive, both as to materials and manufacturing techniques. The stamping out and handling of the individual discs of lithium is costly, and much of the lithium must be scrapped, or recycled at a substantial cost, because it remains in the matrix left by the stamping operation.

In accordance with this invention, the above operations are replaced by operations of extrusion, lamination, slitting, cutting and placing that can be carried out in continuous fashion with substantially no loss of material, and without the need for recycling portions of the lithium used in the manufacturing process. Broadly, the process of manufacturing lithium anode assemblies in accordance with the invention comprises the steps of preparing a supply of lithium foil with at least one freshly exposed surface, and laminating the freshly exposed surface of the lithium to a conductive plastic substrate with the aid of heat and pressure at temperatures well below the melting point of lithium, without the use of a priming coat of conductive plastic adhesive over the lithium as a laminating aid and intermediary. The laminate of lithium and conductive plastic so formed can then be slit and cut into individual anode structures, and assembled into cells and batteries, by continuous manufacturing assembly methods and apparatus such as those devised for the manufacture of conventional laminar cells and batteries, with the exception that each of the operations performed during the manufacture of the anode assemblies and the assembly of the cells which take place prior to the sealing of the cells must be carried out in a controlled atmosphere that is at least relatively inert to lithium and free of water; e.g., in dry air at a relative humidity of not more than 1 to 2 percent.

Laminating lithium to conductive plastic in the manner contemplated by the invention bears superficial similarities to other lamination operations, either suggested for use, or actually performed, in prior battery assembly processes, but with significant differences. For example, in accordance with conventional practice in the manufacture of laminar Leclanche cells, terminal current collectors are formed by laminating tinned steel or aluminum foil to a conductive plastic substrate serving as an electrochemically inert current collector, the latter usually being a carbon filled vinyl such as Condulon conductive plastic as made and sold by Pervel Industries, Inc. of Plainfield, Conn. While it has been suggested that these metals can be laminated directly to the conductive plastic substrate, in practice this is not practical without the use of an intermediate conductive plastic adhesive. The conductive plastic adhesives used for this purpose conventionally incorporate both conductive plastic constituents similar or identical to those used in the conductive plastic current collector, to promote adhesion to the current collector, and conventional metal adhesives, generally similar to the other plastic constituents but containing reactive groups such as hydroxyl, carboxyl, amine or the like to promote adhesion to the metal surface. In the completed laminate, the conductive plastic current collector serves to isolate the electrochemically active structure with which it is in contact, both from the steel or aluminum outer terminal, and from the chemically active metal adhesion promoting radicals in the conductive plastic adhesive. Such a metal adherent adhesive would obviously not be a suitable adjunct in contact with a lithium foil anode.

Other metal—conductive plastic laminates used in the battery art include anode structures comprising zinc. In recent times, the zinc has been in the form of a powder applied to the conductive plastic substrate as an aqueous dispersion, although earlier workers have suggested flame spraying it onto the substrate. Sheet zinc anodes were at one time employed, for example in the high voltage batteries formerly common in vacuum tube radios, but where these were coated with conductive plastic, the latter was generally applied in the form of a dispersion, or paint, in a fugitive vehicle.

The invention will best be understood in the light of the following description, together with the accompanying drawings, illustrative of the practice of the invention in various specific embodiments.

Lithium anode assemblies in accordance with the invention may be made by laminating a sheet of lithium directly to a suitable conductive plastic substrate in a controlled environment, after first providing a freshly exposed lithium substrate at least on the surface of the lithium sheet to which the conductive plastic substrate is to be adhered. The exposure of a fresh lithium surface has been successfully accomplished by scraping the surface of commercially available lithium foil with a razor blade in an argon atmosphere, to remove at least substantial portions of a normal external coating believed to consist primarily of $Li_2O$, $Li_2O.CO_2$, and/or $Li_2CO_3$. For the preparation of commercially significant quantities of lithium anode laminate, it is proposed to provide the desired freshly exposed lithium surface by extrusion of a thin lithium foil, in the manner illustrated in FIG. 1.

Figure 1:
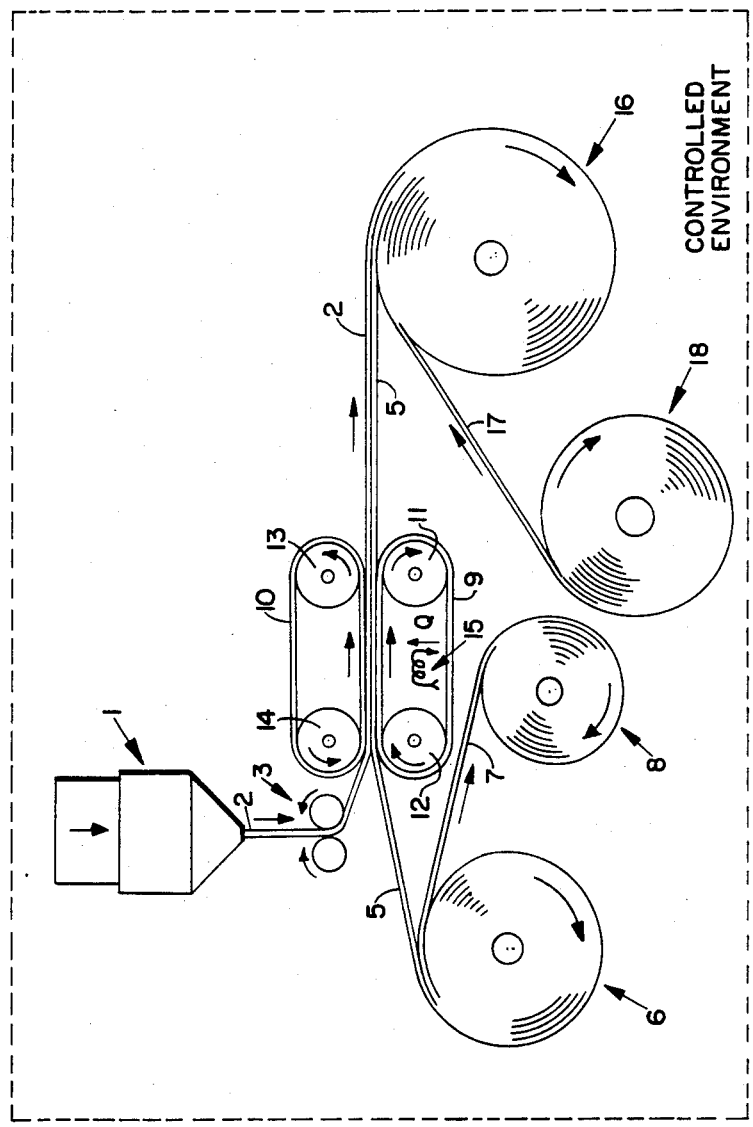
FIG. 1 is a schematic elevational sketch illustrating the manufacture of a laminate of lithium and conductive plastic in accordance with the invention.

Referring to FIG. 1, a billet or ingot of lithium is placed in an hydraulic ram extruder generally designated 1, and there forced through a suitable die, or series of dies, to form an emergent sheet or ribbon 2 of lithium of from 5 to 10 mils (about 0.1 to 0.3 mm) in thickness, and having freshly exposed lithium surfaces. The contaminating surface films to be expected on the original ingot will have been removed, or greatly diluted, in the extrusion process, by reason of the greatly increased surface to volume ratio of the extruded foil 2. If desired, the thickness of the foil 2 may be further reduced, as by driven rolls schematically indicated at 3, to a desired final thickness of from 1 to 3 mils (about 0.02 to 0.08 mm).

The extrusion process, together with any subsequent thickness reducing processes and all further steps in the preparation of cells and batteries in accordance with the invention prior to sealing of the cells, should be carried out in a controlled environment schematically suggested at 4 in FIG. 1. This environment can be an inert gas, such as argon, but in practice will preferably be dry air at a relative humidity of from 1 to 2 percent. The freshly exposed surfaces of the lithium sheet 2 will oxidize in time, even in this environment; thus, it is desirable to carry out the lamination process to be described concurrently with the production of the extruded lithium, rather than, for example, storing the extruded lithium for subsequent lamination.

The extrusion process carried out in the hydraulic extruder 1 is preferably carried out well below the melting point of lithium (180.5° C.), and preferably at about 40° C. (104° F.). The extruder can be kept at constant temperature in the vicinity of this desired operating temperature, as by the circulation of warm water in a suitable heat exchanger formed integral with the extruder housing. At 40° C., the operating pressures in the extruder are expected to be in the vicinity of 2000 p.s.i.

Following the extrusion process and any subsequent further thickness reducing operations, the lithium foil 2 is laminated directly to a sheet of conductive plastic 5. The conductive plastic 5 should be selected from those materials which can be activated thermally to an adhesive state well below the melting point of lithium, which do not contain species reactive with lithium, which can be prepared in the form of a relatively thin web (e.g., from 2 to 10 mils in thickness) without an appreciable population of pinholes, which are relatively resistant to the passage of gases such as $N_2$, $O_2$, $CO_2$, $H_2O$ and the like, which possess a relatively low electrical resistivity for current flow across the web in the neighborhood of 1 to 10 ohm centimeters, and which will adhere to metallic lithium with an adequate peel strength of, say, about 0.5 to 2 pounds per inch as measured by an Instron Tester without the aid of a reactive metal adhesive adjunct. A presently preferred material for this purpose is poly(ethylene/vinyl acetate) containing from 15 to 22 percent by weight, and preferably 22 percent by weight, of a high surface carbon black such as Ketjenblack EC, a carbon black produced by AKZO Chemie of the Netherlands. This composition is prepared in film form by extrusion. The conductive film so formed can be laminated to metallic lithium in a hot platen press, at a temperature of about 270° F. with an effective dwell time of at least three and preferably not more than nine seconds under moderate pressure sufficient to maintain the webs in intimate contact.

As indicated in FIG. 1, in a production process it is contemplated that the conductive plastic web 5 will be taken from a suitable supply roll 6, on the arbor of which it is wound together with a suitable conventional anti-blocking release sheet 7 of paper, polyester, or the like. The release sheet 7 is taken up on a roll 8 for reuse or disposal.

The lithium web 2 and the conductive plastic web 5 are laminated together by passage through laminating belts 9 and 10, of a material suitable for contact with lithium, such as glass fibers in a polytetrafluoroethylene matrix or the like. The belt 9 is carried on a driven roll 11 and an idler roll 12, and the belt 10 is similarly carried on a driven roll 13 and an idler roll 14. The rolls 11, 12, 13 and 14 are conventionally mounted to cause the belts 9 and 10 to exert pressure on the intermediate webs 2 and 5 to maintain them in intimate contact during the lamination process. Conventional means suggested at 15 are provided to supply heat Q to the belts to maintain the belt 9 at the highest temperature, which may be at or slightly above the melting point of lithium, and the belt 10 at a temperature well below the melting point of lithium, so that the temperature of the lithium component of the laminate will not rise to a level more than 10° to 20° C. below its melting point during the laminating process.

Following the laminating process, the laminate 2,5 may be cooled in any conventional manner, and then either slit and cut immediately for assembly into cells in a manner to be described, or taken up on a roll 16 together with a release sheet 17 of paper, polyester or the like from a supply roll 18, for storage and later use.

FIGS. 2–7 illustrate the assembly of a single cell battery comprising an anode assembly in accordance with the invention. While not necessary to the practice of the invention, it is convenient to assemble the battery on an insulating base sheet 20 (FIGS. 2 and 7), of kraft paper or the like, or most preferably of the material more fully shown and described in U.S. Pat. No. 4,086,400, the latter comprising a laminate of kraft paper, a thermoplastic liquid-impervious resin overlying the paper, and an overlayer on the resin of a heat sealing adhesive 21.

Figure 2:
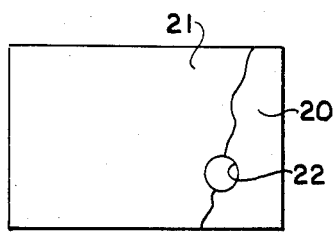
FIG. 2 is a schematic plan sketch, with parts broken away, of a nonconductive laminate useful in the preparation of cells and batteries in accordance with the invention.
Figure 7:
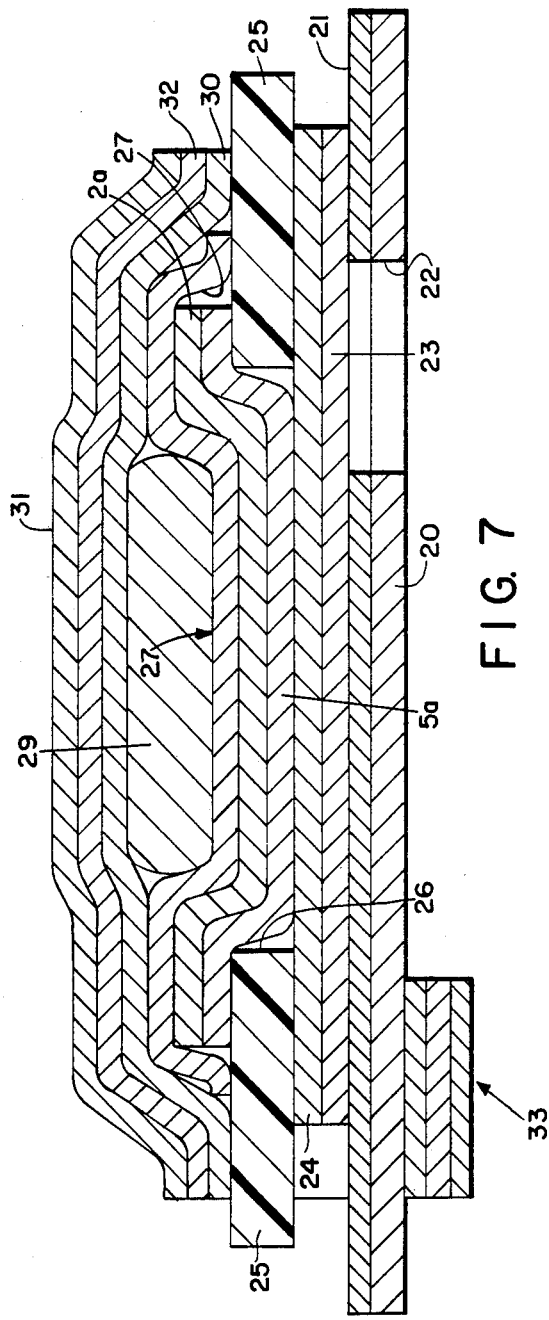
FIG. 7 is a cross-sectional view, on an enlarged scale, showing a completed cell assembled in the manner illustrated in FIGS. 2-5, as seen essentially along the lines 7—7 in FIG. 6.

As shown in FIGS. 2 and 7, the insulating sheet 20 is provided with an aperture 22 to expose the negative terminal of the battery comprising a sheet 23 of metal, preferably a sheet of aluminum foil, for example, of 2 mils in thickness.

The metal terminal sheet 23 is laminated to a selected region surrounding the aperture 22 in the insulating sheet 20, and to the peripheral borders of the sheet 20, but is not necessarily, and preferably is not, laminated to the insulating sheet in other regions.

Figure 3:
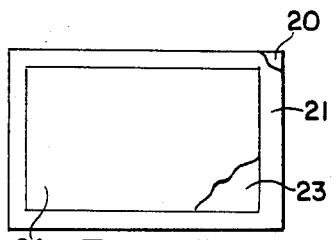
FIG. 3 is a schematic plan sketch similar to FIG. 2, showing additional laminae placed over the laminate of FIG. 2 in the course of assembly of a cell in accordance with the invention.

As shown in FIGS. 3 and 7, the upper side of the metal terminal sheet 23 is preferably coated with a thin layer of conductive priming adhesive 24, typically from 0.1 to 0.8 mils in thickness. Any suitable conductive plastic adhesive adherent to the metal and to the conductive plastic 5 of the anode laminate 2,5 can be employed for this purpose, the most suitable being a composition which is essentially the same as that of the web 5, but which contains a thermoplastic constituent containing reactive groups such as amine, carboxyl, hydroxyl or the like in place of a portion of the ethylene/vinyl acetate constituent of the web 5. One composition found suitable for this purpose is 70 parts by weight of Cabot XC-72 carbon black dispersed in 100 parts by weight of Vitel VPE-307, a polyester resin made and sold by Goodyear Tire and Rubber Co. of Akron, Ohio. This composition is prepared by dissolving the resin in a suitable solvent, such as 80 percent methyl ethyl ketone and 20 percent ethyl acetate, by weight based on the weight of solvent, and dispersing the carbon black in the solution, using sufficient solvent to make a coatable dispersion. This composition is coated on the aluminum, and heated to remove the solvent.

Figure 4:
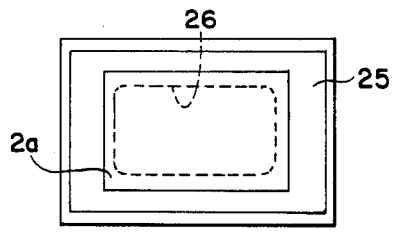
FIG. 4 is a schematic plan sketch similar to FIGS. 2 and 3, showing a cell comprising the components of FIGS. 2 and 3 with the addition of other components.

To the conductive adhesive surface 24 on the aluminum sheet 23 is adhered an insulating frame 25 as seen in FIGS. 4 and 7. The frame 25 is formed with a central aperture 26 which serves to receive other electrochemically active components in a manner to be described.

The frame 25 may be of any suitable conventional electrically insulating material that is inert to the constituents of the cell. One material that has been successfully employed is a 5 mil vinyl, specifically a poly(vinyl chloride/vinyl acetate) containing 85 percent vinyl chloride and 15 percent vinyl acetate by weight, coated on its external surfaces with a poly(ethylene/acrylic acid) adhesive. A presently preferred material is nylon coated with a poly(ethylene/vinyl acetate) adhesive.

An anode electrode structure comprising a sheet 5a of conductive plastic over which a layer 2a of lithium has been laminated in the manner described above is located principally within the aperture 26 formed in the frame 25 and has external borders extending around and over the aperture 26 (FIG. 4), with the conductive plastic sheet 5a being laminated to the edges of the frame 25 around the borders of the aperture 26 and the conductive plastic sheet 5a being laminated to the conductive primer 24 on the conductive metal end terminal sheet 23 as shown in FIG. 7.

Overlying the anode layer 2a in FIG. 7 is a separator 27 (FIGS. 5 and 7) of any conventional material, approximately 2 to 10 mils in thickness. Separators suitable for use in lithium batteries are well known in the art, among those to be considered being polyolefins such as polypropylene, polyethylene, copolymers of propylene and ethylene, mixtures of polyolefins with rubbers such as styrene-butadiene rubber, and the like, together with additives such as $TiO_2$ and the like. A suitable microporous polypropylene separator is sold under the trademark Celgard by Celanese Plastics Co. of Greer, S.C. A presently preferred material is a 2 mil microporous polyolefin separator material of the kind described in U.S. Pat. No. 4,287,276, which incorporates a nonionic wetting agent.

Figure 5:
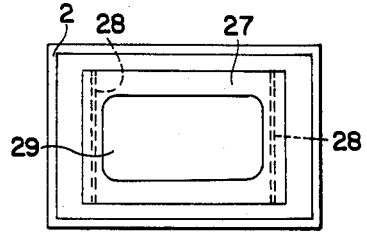
FIG. 5 is a schematic plan sketch similar to FIGS. 2-4, showing a cell in a later stage of manufacture.

The separator 27 is preferably not fully attached along its periphery to the frame 25, but is only selectively adhered thereto, as by means of stripes of adhesive 28 on either side of the separator along two sides thereof, as shown in dotted lines in FIG. 5. The adhesive stripes 28 may be of any selected adhesive material inert to the cell constituents, and for example, of poly(ethylene/vinyl acetate), a polyamide, or the like. Alternatively, and as presently preferred, where the frames are of the type described above with an external coating of a heat activated adhesive, the separator may be heat-tacked to the frame in discrete regions, as at the corners, to provide sufficient adhesion to carry it through the assembly process.

The components just described, comprising the insulating sheet 22, the metal terminal sheet 23, the frame 25, the conductive plastic layer 5a with its adherent layer 2a of lithium, and the separator 27, are preferably formed in a manner described in copending U.S. patent application Ser. No. 295,269, filed on Aug. 24, 1981 by Paul A. Plasse for Laminar Batteries and Methods of Making the Same, assigned to the assignee of this invention and incorporated herein by reference, as a part of a single composite web which acts as an integral subassembly in the process of manufacturing batteries. Overlying the separator 27 in this structure, as seen in FIG. 7, is a cathode 29 of any conventional composition, but preferably formed in the specifically preferred embodiment to be described as a slurry of manganese dioxide and carbon particles in an electrolyte solution in an organic solvent containing a lithium salt as the ionically conductive species. However, various cathodes and electrolyte solutions, and compositions performing the functions of both cathode and electrolyte, are well known in the art for use in conjunction with lithium anodes, and such may be employed within the scope of the invention in its broader aspects.

Suitable cathode slurry compositions comprise from 50 to 100 parts by weight of propylene carbonate and from 0 to 50 parts by weight of 1,2 dimethoxyethane, based on the weight of solvent, as the organic solvent, with $LiAsF_6$ in concentrations of from 0.05 to 2.00 molal, or $LiClO_4$ in concentrations of from 0.65 to 1.97 molal, as the electrolyte. The electrolyte solution may comprise from 35 to 59 percent by weight, based on the weight of slurry, of a dispersion in the solution of $MnO_2$ and carbon black in weight ratios of $MnO_2$ to carbon of from 8 to 1 to 24 to 1.

Specific cathode slurry compositions that have been successfully employed are given in the following examples:

EXAMPLE 1

| Component | Weight Percent |
| --- | --- |
| $LiClO_4$ | 3.61 |
| Propylene Carbonate | 15.66 |
| 1,2-Dimethoxyethane | 15.66 |
| Carbon | 2.60 |
| $MnO_2$ | 62.46 |
|  | 100.0 |

EXAMPLE 2

| Component | Weight Percent |
| --- | --- |
| LiClO$_4$ | 4.61 |
| Propylene Carbonate | 16.56 |
| 1,2-Dimethoxyethane | 16.56 |
| Carbon | 3.69 |
| MnO$_2$ | 58.58 |
| | 100.0 |

EXAMPLE 3

| Component | Weight Percent |
| --- | --- |
| LiAsF$_6$ | 8.98 |
| Propylene Carbonate | 32.01 |
| 1,2-Dimethoxyethane | 13.72 |
| Carbon | 5.03 |
| MnO$_2$ | 40.27 |
| | 100.0 |

EXAMPLE 4

| Component | Weight Percent |
| --- | --- |
| LiAsF$_6$ | 5.70 |
| Propylene Carbonate | 16.37 |
| 1,2-Dimethoxyethane | 16.37 |
| Carbon | 3.65 |
| MnO$_2$ | 57.91 |
| | 100.0 |

EXAMPLE 5

| Component | Weight Percent |
| --- | --- |
| LiAsF$_6$ | 7.94 |
| Propylene Carbonate | 40.00 |
| Carbon | 5.80 |
| MnO$_2$ | 46.26 |
| | 100.0 |

Examples 2 and 4 are presently preferred cathode formulations.

During the preparation of cathode slurries of the compositions given above, the (Kerr-McGee) MnO$_2$ was heated at 375° C. in a furnace for 24 hours under a continuous stream of argon and then stored under vacuum in a glass side arm flask. The MnO$_2$ was redried under vacuum for 6 hours at 160°-170° C., using an oil bath, before introduction into the batteries. The carbon (Cabot XC-72R) was heated to 200° C. for 24 hours in a furnace and then stored under vacuum in a glass side arm flask. The carbon was redried under vacuum at 160°-170° C., using an oil bath, for 6 hours before use in batteries. The LiClO$_4$ was dried under vacuum at 180° C., using an oil bath, for 18 hours and then stored under vacuum in a glass side arm flask. LiAsF$_6$ which included traces of water as indicated by an infrared spectrum was dried in the same manner; if no water was found, this material was used as received from the manufacturer.

The propylene carbonate was refluxed over molecular sieves with 3Å pores for a period of twenty four hours, and then distilled at 73°-75° C. under a vacuum corresponding to an absolute pressure of about 0.1 torr. It was then degassed by freezing, evacuation and thawing. The degassing procedure would probably be unnecessary in a production environment, using an atmosphere of dry air at atmospheric pressure. The 1,2 dimethoxyethane was also refluxed over molecular sieves for 24 hours, and then distilled at 83°-84° C. at atmospheric pressure.

Figure 6:
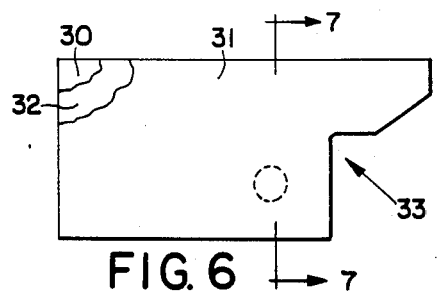
FIG. 6 is a view similar to FIGS. 2-5, showing a cell in a still later stage of manufacture.

Over the cathode 29 is placed a composite end terminal layer comprising, as shown in FIGS. 5, 6 and 7, a sheet of conductive plastic 30, of the same composition as the layer 5a, and for example, of 4 mils in thickness, laminated to a cathode end terminal sheet 31 of metal, preferably of aluminum foil 2 mils in thickness and primed on the side adjacent the conductive plastic layer 30 with a thin coat of conductive plastic adhesive 32 employed for the purpose of adhering the conductive plastic sheet 30 to the metal terminal 31 in a manner known in the art per se and described above.

As indicated in FIGS. 6 and 7, the end terminal laminate comprising the conductive plastic layer 30, the aluminum sheet 31, and the intermediate conductive plastic priming layer 32 is preferably formed with an extension 33 which is folded around the battery to present a positive terminal on the same side as the negative terminal exposed by the aperture 22. Alternatively, this extension can be omitted, as to facilitate stacking batteries in series to provide a higher operating voltage.

Following assembly, the battery of FIG. 7 may be sealed under vacuum by heat and pressure applied around the edges, in the manner described in the above-cited U.S. application Ser. No. 295,269 except that lower temperatures consistent with the materials employed should be utilized.

Commercially available nominally pure lithium foil normally has a surface coating of Li$_2$O, Li$_2$O.CO$_2$ or the like, which does not preclude lamination to a conductive plastic substrate of the kind described above. However, it has been found that markedly improved results can be attained if the surface of the lithium that is to be placed in contact with the conductive plastic is freshly exposed, as by cleaning with a razor blade, shortly before the lamination is carried out. The surface of the lithium that is to be in contact with the electrolyte in the assembled cell is not critical in this regard, as it has been found to make no appreciable difference in the electrical performance of the cell whether or not this surface is cleaned.

In particular, single cell batteries were constructed in the manner described above, using lithium anodes prepared in two ways from commercially available 10 mil lithium foil. For one pair of batteries, identified as Examples A and C below, the lithium foil was cut to size from the foil and laminated directly to sheets of the carbon filled ethylene/vinyl acetate conductive plastic described above. A second pair of batteries, identified as Examples B and D below, were made using lithium foil which had been cleaned with a razor blade on the side to be laminated to the conductive plastic before lamination. The cathode used in each case was 3 grams of a cathode slurry of the following composition:

| Component | Weight Percent |
| --- | --- |
| MnO$_2$ | 62.46 |
| 1,2 Dimethoxyethane | 15.66 |
| Propylene Carbonate | 15.66 |
| Carbon Black | 2.60 |
| LiClO$_4$ | 3.61 |

| -continued | |
|---|---|
| Component | Weight Percent |
| | 100.0 |

Figure 9:
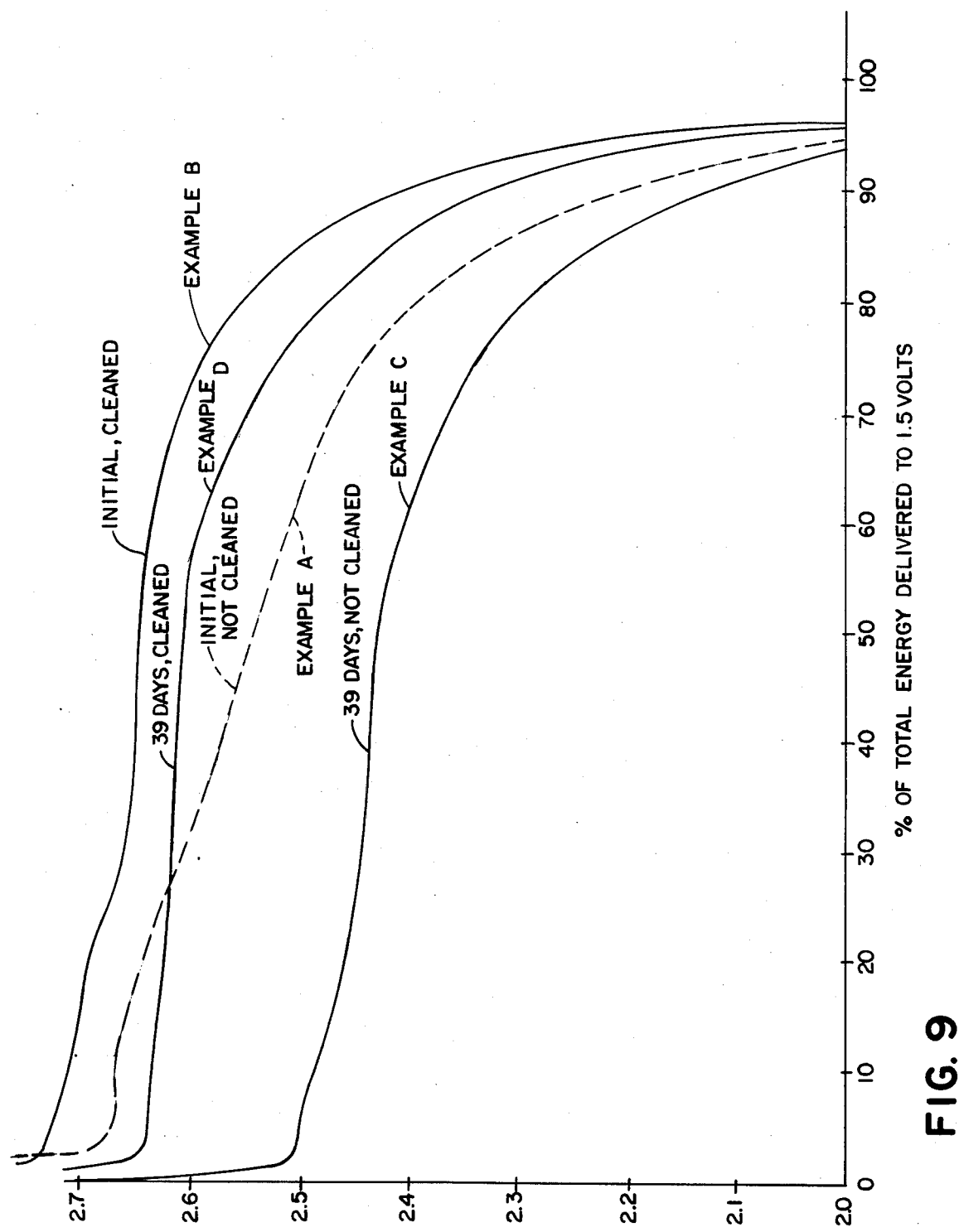
FIG. 9 is a graph comparing the performance of cells comprising lithium anode laminates made with and without a freshly exposed lithium surface in contact with a conductive plastic substrate.

The batteries of Examples A and B were tested immediately after electrochemical assembly (ECA), by recording the voltages at intervals during the discharge of the cells at a constant current of 0.020 amperes, down to voltages of 1.5 volts or less. The recorded voltages were plotted graphically as a function of time, and the amount of electrical energy delivered to the load as a function of battery voltage under load was determined by integration. The batteries of Examples C and D were tested in the same manner but 39 days after ECA. FIG. 9 shows the results in terms of battery closed circuit voltage versus percent of total energy delivered down to that voltage as a percent of the total energy delivered down to 1.5 volts, for each of Examples A, B, C and D.

As shown in FIG. 9, the freshly assembled battery of Example B, in which the lithium was cleared prior to lamination, delivered 90 percent of the total energy at voltages above 2.41, whereas the battery of Exhibit A, in which the lithium surface was not cleaned, delivered only about 81 percent of its available energy above 2.41 volts. After 39 days storage, the results were even more dramatic; the battery of Example D, with the cleaned lithium surface, delivered about 86.5 percent of its energy at voltages above 2.41 volts, whereas the battery of Example C, with the uncleaned lithium surface, delivered only about 61.5 percent of its energy at 2.41 volts or higher.

In some practical applications, particularly where 9 volts nominal voltage is specified, the amount of energy delivered down to a cutoff voltage of 7.5 volts, or 2.5 volts per lithium cell, is a significant parameter. From FIG. 9, it will be seen that the battery of Exhibit D delivered over 78 percent of its available energy at 2.5 volts or above, whereas the battery of Example C delivered only from 8 to 9 percent of its available energy above this level.

As a measure of the comparability of the batteries of Examples A, B, C and D, their initial open circuit voltage (OCV), total energy Wt, in watt hours, delivered to 1.5 volts, and the time T, in minutes, to 1.5 volts at 0.020 amperes, are given below:

| Example | OCV | Wt | T |
|---|---|---|---|
| A | 3.261 | 1.103 | 1325 |
| B | 3.253 | 1.109 | 1325 |
| C | 3.282 | 1.103 | 1408 |
| D | 3.279 | 1.182 | 1387 |

Multiple cell batteries may be made by stacking single cell batteries of the type described above. Integrally packaged laminar multiple cell lithium batteries with reasonable shelf lives cannot be manufactured with a construction analogous to that described in the above-cited U.S. application Ser. No. 295,269. However, as more fully described in copending U.S. patent application Ser. No. 341,196, filed on Jan. 20, 1982, by Alan H. Bruder for Laminar Multicell Lithium Batteries and assigned to the assignee of this invention, such batteries can be manufactured successfully if the construction next to be described in connection with FIG. 8 is employed.

Figure 8:
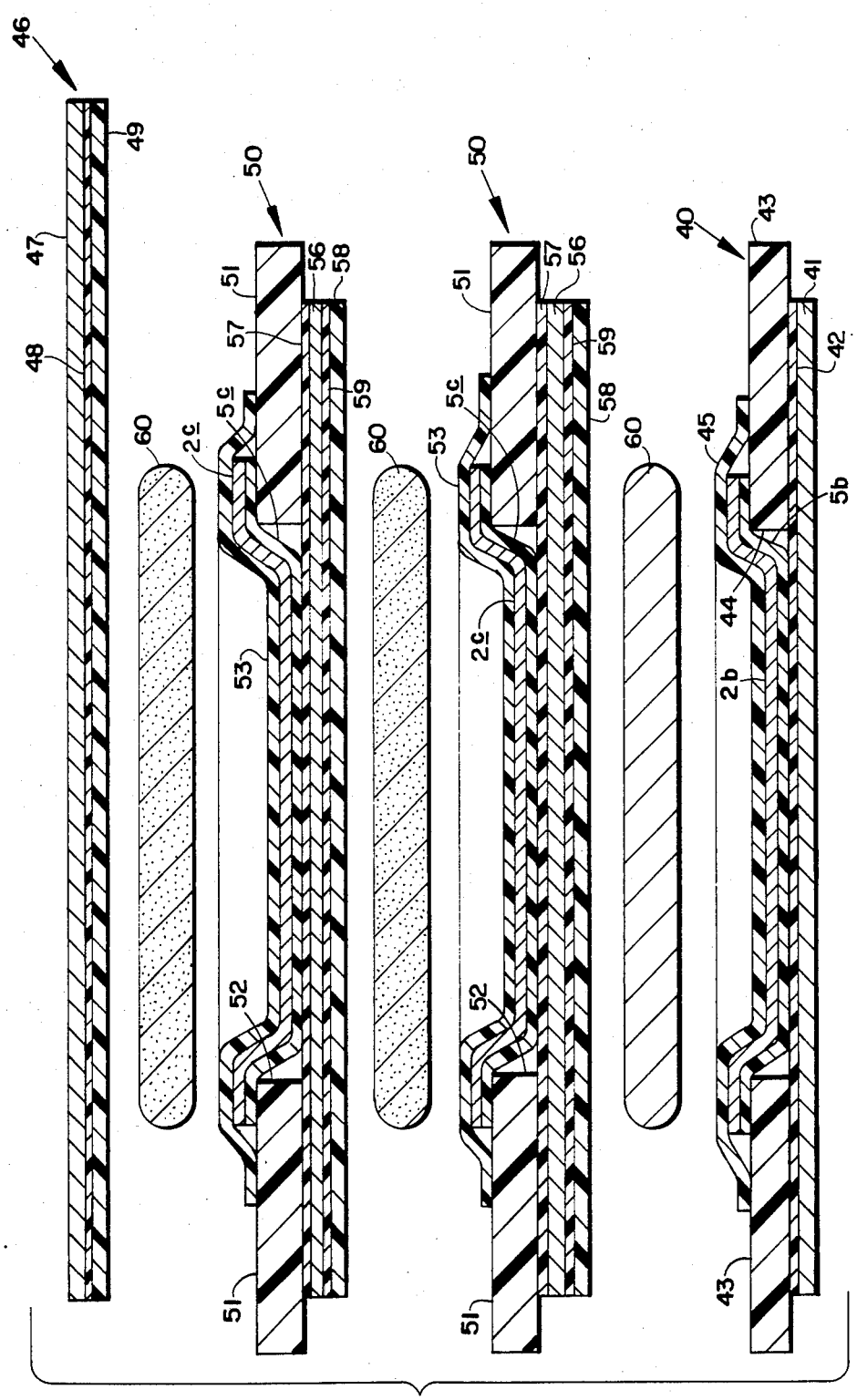
FIG. 8 is an exploded schematic cross-sectional elevational view of a multicell battery comprising anode assemblies in accordance with the invention.

FIG. 8 shows an exploded view of a three cell lithium battery. As will be apparent to those skilled in the art from the following description, this construction is readily adapted to the manufacture of batteries having any number of cells larger than one.

Referring to FIG. 8, the battery may comprise an anode end terminal half cell 40 which is identical with that described above in connection with FIG. 7. Specifically, the anode end terminal collector may comprise a sheet 41 of a suitable conductive metal, such as 2-mil aluminum or the like, coated with a thin layer 42 of a conductive plastic adhesive such as that comprising the layer 24 in FIG. 7.

To the conductive adhesive surface 42 on the aluminum sheet 41 is adhered an insulating frame 43, which may be identical with the frame 25 described above in connection with FIGS. 4 and 7. The frame 43 is formed with a central aperture 44, corresponding to the aperture 26 in the frame 25.

An anode electrode structure comprising a sheet 5b of conductive plastic over which a layer 2b of lithium has been laminated in the manner described above is located principally within the aperture 44 formed in the frame 43 and has external borders extending around and over the aperture 44 (FIG. 8), with the conductive plastic sheet 5b being laminated to the edges of the frame 43 around the borders of the aperture 44 and the conductive plastic sheet 5b being laminated to the conductive primer 42 on the conductive metal end terminal sheet 41, identically as for the corresponding elements described above in connection with FIG. 7.

Overlying the anode layer 2b in FIG. 8 is a separator 45, which may be the same as the separator 27 in FIG. 7. The separator 45 is preferably not fully attached along its periphery to the frame 43, but is only selectively adhered thereto in the manner described above in connection with FIG. 5.

The components of the end terminal half cell assembly 40 just described, comprising the insulating sheet 22, the metal terminal sheet 41, the frame 43, the conductive plastic layer 5b with its adherent layer 2b of lithium, and the separator 45, are preferably adhered to an insulating sheet such as the sheet 22 described above, not shown in FIG. 8, to provide an insulating base for the battery in the manner described above for a single cell battery.

The cathode end terminal 46 of the battery of FIG. 8 is formed as a laminate of metal foil 47, such as aluminum 2 mils in thickness, coated with a thin coat 48 of a conductive plastic adhesive and thereby laminated to a sheet 49 of conductive plastic 49. This laminate corresponds in structure and function to the end terminal layer comprising the metal end terminal sheet 31 primed with conductive plastic adhesive 32 and laminated to the conductive plastic sheet 30 as described above in connection with FIGS. 5, 6 and 7. In the same manner, the end terminal 46 may be provided with a projection 49 at one end to be folded around to the other side of the battery, to present the positive terminal on the same side of the battery as the negative terminal.

Between the anode end terminal half cell subassembly 40 and the end terminal 46 at the cathode end of the battery are n−1 intercell subassemblies 50, where n is the total number of cells in the battery. Each of the intercell subassemblies 50 may be a subassembly such as 40, to which a layer of conductive plastic is adhered for purposes to appear.

That portion of each subassembly 50 which may be identical with the end terminal subassembly 40 comprises a frame 51, which may be identical with the frame 43 and formed with a central aperture 52 corresponding to the aperture 44 in the frame 43; an anode assembly comprising a lithium foil anode 2c laminated to a conductive plastic sheet 5c corresponding in structure and function to the elements 2b and 5a; a separator 53 corresponding to the separator 45; and a solvent barrier layer 56 which may be of any suitable material which is both electrically conductive and essentially impermeable to the nonaqueous solvent included in the cathode slurry, but which in a preferred embodiment comprises a sheet of metal foil, such as 2 mil aluminum foil, identical with the metal terminal sheet 41.

As in the subassembly 40, the sheet 56 is suitably adhered to the frame 51 and to confronting regions of the conductive plastic sheet 5c, as by an intermediate layer of conductive plastic adhesive 57, from 0.1 to 0.8 mils in thickness. As in the corresponding structures previously described, the edges of the conductive plastic sheets 5c are adhered to the borders of the frames 51 around the apertures 52, and the separators 53 are selectively adhered to portions of the frames 51 only in discrete regions.

To each of the solvent barrier sheets 56 is adhered a sheet of conductive plastic 58, as by an intermediate layer 59 of conductive plastic adhesive. These layers 58 and 59 may correspond in structure and composition to the layers 47 and 48 of the end terminal assembly 46; e.g., the layer 58 may be from 3 to 10 mils in thickness, and preferably from 4 to 6 mils, and the layer 59 from 0.1 to 0.8 mils, and preferably about 0.2 mils, in thickness.

The battery of FIG. 8 is completed by cathode slurry deposits 60, which may correspond in amount, dimensions and composition to the cathode 29 in FIG. 7. The battery may be assembled by adhering the metal terminal sheet 41 forming the base of the subassembly 40 to a nonconductive web such as the base sheet 22, 21 in FIG. 7; depositing the first cathode 60 on the separator 45; next adding in sequence a subassembly 50, cathode 60, another subassembly 50, another cathode 60, and so on until the assembly is terminated by an end terminal 46. The battery is then sealed under vacuum by applying heat and pressure to the edges, to effect a seal between confronting faces of the frames 43 and 51 and the conductive plastic layer 49 of the end terminal 46.

The gross structural difference between a lithium battery constructed as just described in connection with FIG. 8 and a Leclanche battery constructed in accordance with such practices as are described, for example, in the above-cited copending U.S. application Ser. No. 295,269, apart from differences in chemistry, is that in Leclanche structures, the intercell anode assemblies generally corresponding to the assemblies 50 in FIG. 8 lack the solvent barrier layers 56, the layers of conductive plastic adhesive 57 and 59 on both sides of the layers 56, and the conductive plastic sheets 58 of FIG. 8.

In the subassemblies 50 of FIG. 8, the frames 51 perform their normal function of providing an electrically insulating barrier against intercell and intracell shorts, and the conductive plastic layers 5c serve to provide electronically conducting, electrochemically isolating barriers. These elements alone would apparently provide sufficient intercell isolation; however, batteries constructed without the additional barrier layers 56 have been found to develop very high internal impedances. The cause of high impedance in these structures, though perhaps not established beyond peradventure, is speculated to be a relatively subtle permeation of the conductive plastic layers such as 50, in the absence of the barrier layers 56, by organic solvents in the cathode slurry, and particularly by reactive solvents such as propylene carbonate. Such permeation might result in the formation of a highly nonconductive barrier layer; e.g., of $Li_2CO_3$, $Li_2O.CO_2$, or the like; on the lithium anode. The degree of such permeation, if any, is not such as to affect the end terminal assemblies such as 46 in FIG. 8, a finding which is harmonizable with the above assumption either on the theory that there is no appreciable reaction between aluminum and the solvents, or that any reaction products of the interaction between aluminum and solvents such as propylene carbonate would be self-limiting films so thin as to oppose no appreciable barrier to electronic conduction. In any event, the interposition of effective solvent barriers such as 56 has been found to eliminate the high impedance problem.

In the subassemblies 50 in FIG. 8, the solvent barrier 56, which is preferably of aluminum, does not perform simply as a highly conductive current collector, as does the sheet 41; it would be superfluous if that was its only function. Rather, it is to provide an essentially complete barrier against the passage of organic solvent from a cathode in one cell to the anode in the next adjacent cell.

The accompanying layer 58 of conductive plastic is needed to isolate the barrier layer 56 from the adjacent cathode 60, and the conductive plastic layers 57 and 59 simply serve to adhere the various layers together sufficiently to prevent delamination in service, while providing a low resistance to the flow of electrical current.

As more fully described in my copending U.S. application for U.S. patent Ser. No. 340,990, filed concurrently herewith for Hermetically Sealed Lithium Batteries and assigned to the assignee of this invention, which is incorporated herein by reference, the shelf life of lithium batteries with $MnO_2$ cathodes can be considerably enhanced by a partial electrical discharge of the battery during or immediately after electrochemical assembly (i.e., at least within a few hours of ECA), prior to storage, shipment and sale of the batteries. For this purpose, the battery can be connected to a resistor suitable for draining about 20 milliamperes for a time sufficient to remove from 1 to 3 percent of the total capacity of the battery. This practice is preferably followed as a final step in the preparation of batteries in accordance with the invention.

While the invention has been described with respect to the details of specific illustrative embodiments, many changes and variations will become apparent to those skilled in the art upon reading this description, and such can obviously be made without departing from the scope of the invention.

Having thus described the invention, what is claimed is:

1. A laminar electrical cell, comprising an anode, a cathode, and an electrolyte permeable separator beween said anode and said cathode, said anode consisting essentially of a layer of lithium having at least one surface of unreacted lithium metal in direct contact with and adhered to a layer of conductive plastic with no intermediate adhesive promoting adjuncts, and said cathode comprising a slurry of $MnO_2$ and carbon particles in a solution of a lithium salt in an organic solvent, said solution permeating said separator and being in contact with said lithium.

2. In a lithium battery, an anode consisting essentially of a thin sheet of lithium having at least one surface of unreacted lithium metal in direct contact with and adhering to a thin sheet of conductive plastic with no intermediate adhesive promoting adjuncts.

3. A lithium battery, comprising an anode consisting essentially of a thin sheet of lithium having at least one surface of unreacted lithium metal adhered to a thin sheet of conductive plastic with no intermediate adhesive promoting adjuncts, a cathode consisting essentially of a wet anhydrous slurry of Mno$_2$ and carbon particles in a solution of a lithium slat in an organic solvent, and a separator permeated by said solvent between said cathode and said anode.

4. The battery of claim 3, in which said lithium salt is LiAsF$_6$, and in which said organic solvent consists essentially of from 30 to 100 parts by weight of propylene carbonate and from 0 to 70 parts by weight of 1,2 dimethoxyethane.

5. In a lithium battery, an anode consisting essentially of a layer of lithium having a first major surface and a second major surface opposite said first surface in direct contact with and adhered to a layer of a dispersion of carbon particles in a copolymer of ethylene and vinyl acetate with no intermediate adhesive promoting adjuncts, said second surface consisting essentially of unreacted lithium metal.

* * * * *